United States Patent [19]

Kester et al.

[11] Patent Number: 4,960,600

[45] Date of Patent: Oct. 2, 1990

[54] POLYOL POLYESTERS AS A PROTECTIVE MOISTURE BARRIER FOR FOODS

[75] Inventors: Jeffrey J. Kester, West Chester; Christian A. Bernhardt, Fairfield; Joseph J. Elsen; James A. Letton, both of Cincinnati; Mary M. Fox, Fairfield, all of Ohio

[73] Assignee: The Procter & Gamble Co., Cincinnati, Ohio

[21] Appl. No.: 287,923

[22] Filed: Dec. 21, 1988

[51] Int. Cl.$^5$ ............................................. A23B 4/10
[52] U.S. Cl. .................................... 426/310; 426/302; 426/89; 426/98; 426/99
[58] Field of Search .................... 426/99, 98, 89, 92, 426/310, 302

[56] References Cited

U.S. PATENT DOCUMENTS

| | | |
|---|---|---|
| 3,600,186 | 8/1971 | Mattson et al. |
| 4,005,195 | 1/1977 | Jandacek |
| 4,005,196 | 1/1977 | Jandacek et al. |
| 4,034,083 | 7/1977 | Mattson |
| 4,170,659 | 10/1979 | Totino et al. ........................ 426/100 |
| 4,171,380 | 10/1979 | Forkner ................................ 426/95 |
| 4,293,572 | 10/1981 | Silva et al. ............................. 426/94 |
| 4,582,927 | 4/1986 | Fulcher |
| 4,673,581 | 6/1987 | Fulcher |
| 4,797,300 | 1/1989 | Jandacek et al. |

FOREIGN PATENT DOCUMENTS

| | | |
|---|---|---|
| 0233856 | 9/1987 | European Pat. Off. |
| 0236288 | 9/1987 | European Pat. Off. |
| 207070 | 2/1984 | German Democratic Rep. |

OTHER PUBLICATIONS

Olestra Food Additive Petition (Procter & Gamble), filed with F.D.A., May 7, 1987.

Food Technology 40(12), pp. 47-59 (Kester et al.), June, 1986.

Edible Coatings and Soluble Packaging, Noyes Data Corp., Park Ridge, N.J., pp. 2, 22, 52, 53, 55, 56, 59, 67, 77, 81, 90, 110, 125, 148, 182, 210, 240, 252, 285, and 317 (Daniels), 1973.

Chemistry of Physics and Lipids, 22, pp. 163-176 (1978).

USSN 196, 914 (Hellyer et al.), filed May 20, 1988.

USSN 094,950 (Mijac et al.), filed Sept. 9, 1987.

USSN 229,898, CIP of USSN 046, 217 (Baginski et al.), filed June 8, 1988 and May 5, 1987.

USSN 175,004, CIP of USSN 047,367 (Guffey et al.), filed Apr. 12, 1988 and May 6, 1987.

Inside R&D (5/20/87).

USSN 175,406, CIP of USSN 047,367 (Talkington et al.), filed Apr. 13, 1988 and May 6, 1987.

USSN 211,208 (Kayes et al.), filed June 24, 1988.

American Journal of Clinical Nutrition 29, pp. 1204-1215 (Fallat et al.), Nov., 1976.

*Primary Examiner*—Donald E. Czaja
*Assistant Examiner*—Drew S. Workman
*Attorney, Agent, or Firm*—Gary M. Sutter; Chester Cekala, Jr.; Richard C. Witte

[57] ABSTRACT

The present invention is a method for reducing the rate of moisture transmission into and out of foods comprising coating the surface of the foods with a coating containing an effective amount of polyol fatty acid esters. The polyol fatty acid esters have at least 4 fatty acid ester groups, and at least about 80% of the fatty acids contain not less than 12 carbon atoms. The method is particularly useful for preserving the crispness and thereby prolonging the shelf life of cereal and/or starch based snack foods.

18 Claims, No Drawings

POLYOL POLYESTERS AS A PROTECTIVE MOISTURE BARRIER FOR FOODS

TECHNICAL FIELD

The field of the invention is protective coatings for foods, used to reduce the rate of moisture transmission into or out of the foods. The invention is particularly applicable to dry cereal and/or starch-based snack foods, and a method for preserving the crispness of these snack foods by coating the foods with polyol fatty acid polyesters.

BACKGROUND ART

Crispness is a desirable textural attribute of dry snack foods, and its loss due to the absorption of moisture from the air is a cause of product rejection by the consumer. Absorbed water decreases the crispness of dry snack foods by plasticizing and softening the starch/protein matrix. Therefore, it would be desirable to find a method to retard moisture uptake by these products, thereby maintaining a desirable crisp texture for a longer period of time and prolonging product shelf-life.

A method for reducing moisture transmission would also be useful with foods such as bakery products and dehydrated fruits, vegetables and meats, where it is desirable to lower the rate of moisture absorption; and foods such as fresh fruits, vegetables and meats, and frozen foods, where it is desirable to reduce moisture loss.

Foods made with sucrose fatty acid polyesters are known to the art. U.S. Pat. No. 3,600,186 to Mattson et al., issued Aug. 17, 1971, describes low-calorie food compositions produced by replacing at least a portion of the fat content of a conventional food with a sugar fatty acid polyester or sugar alcohol fatty acid polyester. The polyesters are said to be useful as a partial or total replacement for normal triglyceride fat in salad or cooking oils, or plastic shortenings for use in frying, cake making, bread making or the like. A plastic shortening is disclosed made with 50% sucrose octastearate. A deep fat frying oil is disclosed made from erythritol tetraester of olive oil fatty acid (ETOFA). Also disclosed is pan frying and deep fat frying of various foods in ETOFA: potato pieces, eggs, beefsteaks, breaded shrimp and breaded codfish steaks.

European Patent Application No. 0,236,288 of Bernhardt, published Sept. 9, 1987, discloses sucrose polyesters esterified with $C_8$ to $C_{22}$ fatty acids. The preferred fatty acid composition is said to be 9–12% palmitic, 42–53% stearic, 19–39% oleic, 2–17% linoleic, 0–2% linolenic, 0–2% arachidic, 0–10% behenic, and 0–2% erucic. The polyesters are disclosed as being useful in making frying oils, and foods fried in oils such as potato chips, corn chips, and other fried farinaceous snack foods.

U.S. Pat. No. 4,005,195 to Jandacek, issued Jan. 25, 1977, discloses liquid polyol fatty acid polyesters and anti-anal leakage agents used for the treatment of hypercholesterolemia. In Example IV a cooking fat is disclosed made with 50% liquid sucrose polyester and 50% cocoa butter; the sucrose polyester is an average 7.5 ester of sucrose and oleic acid.

U.S. Pat. No. 4,005,196 to Jandacek, issued Jan. 25, 1977, discloses a combination of liquid polyol polyesters, anti-anal leakage agents, and fat-soluble vitamins. Example VI discloses a cooking fat made with 70% sucrose octaoleate and 30% sucrose octastearate.

U.S. Pat. No. 4,034,083 to Mattson, issued July 5, 1977, discloses polyol fatty acid polyesters fortified with fat-soluble vitamins and used in food or pharmaceutical compositions for treating and/or preventing hypercholesterolemia. Cooking oils and plastic shortenings are specifically mentioned. In Example V, Mattson discloses a plastic shortening said to be suitable for use in frying and other types of cooking, the shortening containing 40% xylitol pentaoleate.

None of these references suggests that polyol fatty acid polyesters are more effective at reducing moisture transmission than triglycerides, and none suggests that particular fatty acid compositions are required for this benefit.

It is, therefore, an object of the present invention to provide a method for reducing the rate of moisture transmission into and out of foods.

It is a particular object of the present invention to provide a method for preserving the crispness of dry cereal and/or starch based snack foods.

It is a related object of the present invention to accomplish the above-mentioned objects by coating the foods with particular polyol fatty acid polyesters.

These and other objects of the invention will become evident from the disclosures herein.

All parts, percentages and ratios used herein are by weight unless otherwise indicated.

SUMMARY OF THE INVENTION

The present invention is a method for reducing the rate of moisture transmission into and out of foods comprising coating the surface of the foods with a coating comprising an effective amount of polyol fatty acid esters, wherein the polyol fatty acid esters have at least 4 fatty acid ester groups, and wherein at least about 80% of the fatty acids contain not less than 12 carbon atoms. The method is particularly useful for preserving the crispness and thereby prolonging the shelf life of cereal and/or starch based snack foods.

DETAILED DESCRIPTION OF THE INVENTION

The present invention relates to a method for reducing the rate of moisture transmission into and out of foods. The invention is particularly useful for protecting the crisp texture of dry cereal and/or starch-based snack foods. This advantage is achieved by applying a coating of polyol fatty acid polyesters onto the surface of the finished products prior to packaging.

It has now been surprisingly discovered that polyol fatty acid polyesters having a fatty acid chain length of predominantly $C_{12}$ or longer are more highly resistant to water vapor transport than conventional triglyceride oils. In fact, sucrose polyesters comprised principally of $C_{16}$ and $C_{18}$ chain-length fatty acids are approximately 2.5-fold more resistant to water vapor transmission than conventional triglyceride oils of a similar fatty acid composition (e.g., soybean oil, canola oil). As a consequence, the rate of moisture absorption into a polyol polyester-coated snack food product is significantly slower relative to a triglyceride-coated product. The net effect is an extended storage life for the polyol polyester-coated snack food.

The present invention, then, is a method for reducing the rate of the moisture transmission into and out of foods comprising coating the surface of the foods with a coating comprising an effective amount of polyol fatty acid esters, wherein the polyol fatty acid esters have at least 4 fatty acid ester groups, and wherein at least about 80% of the fatty acids contain not less than 12 carbon atoms. Sucrose is a preferred polyol.

For a given coating composition, better moisture barrier properties are obtained by replacing at least part of the triglyceride in the coating with an equal amount of polyol fatty acid esters. Preferably, a coating according to the present invention comprises at least about 25% polyol fatty acid esters, more preferably at least about 50%, and more preferably at least about 75%. To obtain the maximum reduction in the rate of moisture transmission, most preferably the coating comprises about 100% polyol fatty acid esters.

The present coatings can be flavored in different ways, for example, chocolate, vanilla, peanut butter, or dairy-flavored. Any flavored fatty-based coating can be made.

In addition to the polyol fatty acid esters, the present coatings can contain any conventional coating ingredients, such as triglycerides, dairy products (e.g., yogurt or cream), sweeteners, chocolate, or other coating ingredients known to the art.

Polyol Fatty Acid Polyesters

The polyol fatty acid polyesters suitable for use in the present invention are selected from the group consisting of sugar fatty acid polyesters and sugar alcohol fatty acid polyesters, and mixtures thereof.

Sugar or sugar alcohol fatty acid polyesters comprise sugars or sugar alcohols, and fatty acids. The term "sugar" is used herein in its conventional sense as generic to mono- and disaccharides. The term "sugar alcohol" is also used in its conventional sense as generic to the reduction product of sugars wherein the aldehyde or ketone group has been reduced to an alcohol. The sugar or sugar alcohol must contain at least 4 hydroxyl groups. The fatty acid ester compounds are prepared by reacting a monosaccharide, disaccharide or sugar alcohol with fatty acids as discussed below.

Examples of suitable monosaccharides are those containing 4 hydroxyl groups such as xylose, arabinose, and ribose; the sugar alcohol derived from xylose, i.e., xylitol, is also suitable. The monosaccharide erythrose is not suitable for the practice of this invention since it only contains 3 hydroxyl groups; however, the sugar alcohol derived from erythrose, i.e. erythritol, contains 4 hydroxyl groups and is thus suitable. Among 5 hydroxyl-containing monosaccharides that are suitable for use herein are glucose, mannose, galactose, fructose, and sorbose. A sugar alcohol derived from sucrose, glucose, or sorbose, e.g., sorbitol, contains 6 hydroxyl groups and is also suitable as the alcohol moiety of the fatty acid ester compound. Examples of suitable disaccharides are maltose, lactose, and sucrose, all of which contain 8 hydroxyl groups.

In preparing sugar or sugar alcohol fatty acid polyesters of the present invention a sugar or sugar alcohol compound such as those identified above must be esterified with fatty acids having from about 2 to about 24, preferably from about 4 to about 24, most preferably from 8 to 22, carbon atoms. The fatty acids can be derived from suitable naturally occurring or synthetic fatty acids and can be saturated or unsaturated, including positional and geometric isomers (e.g., cis and trans isomers).

Importantly, for purposes of reducing the moisture transport rate, it has been discovered that at least about 80% of the fatty acids must contain not less than 12 carbon atoms. Preferably at least about 95% of the fatty acids will contain not less than 12 carbon atoms. More preferred are polyol fatty acid polyesters wherein at least about 90% of the fatty acids contain not less than 16 carbon atoms, and most preferred at least about 95%. Examples of such fatty acids having 12 or more carbon atoms include lauric, myristic, myristoleic, palmitic, palmitoleic, stearic, oleic, linoleic, linolenic, eleostearic, arachidic, arachidonic, behenic, and erucic acid. Preferably at least about 90% of the fatty acids are selected from the group consisting of palmitic, stearic, oleic, linoleic, behenic, and mixtures thereof.

A characterizing feature of the sugar or sugar alcohol fatty acid polyesters useful in this invention is that they predominantly contain at least 4 fatty acid polyester groups. Sugar or sugar alcohol fatty acid polyester compounds that contain 3 or less fatty acid ester groups are digested in the intestinal tract much in the manner as ordinary triglyceride fats, but sugar or sugar alcohol fatty acid polyester compounds that contain four or more fatty acid ester groups are digested to a lesser extent and thus have desirable low calorie properties.

It is known that liquid polyol fatty acid polyesters can cause an anal leakage effect. U.S. Pat. No. 4,005,195 of Jandacek and U.S. Pat. No. 4,005,196 of Jandacek et al., both incorporated by reference herein, disclose a method of avoiding this problem by the addition of anti-anal leakage agents to the liquid polyesters. Therefore, a preferred embodiment of the present invention is a food product coated with a liquid polyol polyester that additionally comprises sufficient anti-anal leakage agent to prevent leakage of the polyol polyester. Preferably there is present at least about 3% anti-anal leakage agent by weight of the polyol polyester, more preferably between about 3% and about 10%.

Polyol fatty acid polyesters having a high liquid/solid stability have been found to be highly resistant to anal leakage. By "liquid/solid stability" is meant that the liquid portion of the polyesters does not readily separate from the solid portion. The polyol polyesters preferably have a liquid/solid stability of at least about 30%, more preferably at least about 50%, more preferably at least about 70%, and most preferably at least about 90%. A minimum solids content in the polyol fatty acid polyesters is also preferred for anti-anal leakage control. The polyesters preferably have a solid fat content of at least about 3% at 100° F. (37.8° C.), more preferably between about 3% and about 10%.

It is also preferred that the polyol polyesters have a viscosity at 100° F. (37.8° C.) of at least about 0.5 poise after 10 minutes of steady shear at a shear rate of 10 seconds$^{-1}$, more preferably at least about 5 poise, and most preferably at least about 15 poise. The preferred upper limit of the viscosity of these polyesters is about 800 poise after 10 minutes of shear at a shear rate of 10 seconds$^{-1}$.

Highly preferred polyol fatty acid polyesters are sucrose fatty acid polyesters. Preferred sucrose fatty acid polyesters have the majority of their hydroxyl groups esterified with fatty acids. Preferably at least about 85%, and most preferably at least about 95%, of the sucrose fatty acid esters are selected from the group consisting of octaesters, heptaesters and hexaesters, and mixtures thereof. Preferably, no more than about 35% of the esters are hexaesters or heptaesters, and at least about 60% of the esters are octaesters. Most preferably, at least about 70% of the esters are octaesters. It is also most preferred that the polyesters have a total content of penta- and lower esters of not more than about 3%.

The preferred iodine value of the sucrose polyesters is between about 10 and about 60, more preferably between about 25 and about 60.

The polyol fatty acid polyesters suitable for use herein can be prepared by a variety of methods known to those skilled in the art. These methods include: transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. As an example, the preparation of sucrose fatty acid polyesters is described in U.S. Pat. Nos. 2,831,854, 3,600,186, 3,963,699, 4,517,360 and 4,518,772 (all herein incorporated by reference).

Food Applications

The method of the present invention for lowering the rate of moisture transmission is applicable to many kinds of food compositions. Depending on the particular food use, the method can be used either to retard moisture absorption, retard moisture loss, or both.

For example, in a preferred embodiment of the present invention, dry cereal and/or starch-based snack foods can be sprayed with a coating of polyol polyesters to preserve the crispness of the foods. Cereal-based snack foods include the snack foods made from wheat, rye, barley, rice and other cereal grains. These snack foods include soda or saltine crackers, butter-thin crackers, milk crackers, cheese crackers and pretzels. Starch-based snack foods include the snack foods made from potatoes, corn, and other starch-containing plants. These snack foods include potato chips, corn chips, tortilla chips, taco chips, and shoestring potatoes.

Breakfast cereals are another preferred product of the invention. By applying the present coating to the surface of breakfast cereals, the cereals absorb milk more slowly and thus stay crisper longer.

Another use for the method of the present invention is with dehydrated food products such as dehydrated fruits, vegetables, and meats. The present method protects these foods against moisture absorption and prolongs their storage life. Similarly, it is important to prevent moisture absorption with dry fruits such as raisins, prunes and dates, because moisture absorption causes the fruits to become sticky and clump together.

Fresh fruits and vegetables also be protected by the method of the invention. Too much water loss from these products detracts from their fresh quality. Fresh meat and fish can also be protected against moisture loss.

The process is also useful with frozen foods such as frozen meats and vegetables to reduce moisture loss. By reducing the moisture loss from frozen foods in frost-free freezers, it is possible to reduce the demands made on frozen food package designs.

The coatings of the invention can be used to reduce moisture transmission into and out of confectioneries, such as chocolate candy or other candy. Additionally, nuts can be coated with polyol polyesters to decrease the rate of moisture transmission.

A further use of the method of the invention is coating bakery products to reduce moisture absorption. For example, with bakery products such as ice cream cones or food bars, moisture absorption decreases the crispness of the products. Moisture absorption by doughnuts can cause their glaze or icing coatings to weep or run. With cakes, cookies, pastries and similar baked goods, it is desired to reduce moisture loss to prevent the products from becoming dry and stale.

The fruits, vegetables, meats and other foods protected by the method of the invention can be fresh, frozen, dried, processed, cooked, or in any other form appropriate for the particular food.

The present method for reducing the rate of moisture transmission into and out of foods includes reducing the internal migration of moisture from one component of a heterogeneous food to another. The driving forces for intercomponent water transport are the same as for moisture exchange between a food and the surrounding environment (i.e., water vapor pressure differential, liquid water concentration gradient). Thus, the polyol fatty acid polyesters of the invention can act as a barrier to intercomponent moisture transport in multicomponent food systems. For example, it may be desirable to coat a dry pie crust with sucrose polyesters to prevent moisture transmission from a high-moisture pie filling. Similarly, the invention is useful with toaster pastries and other filled pastries, in which a moist filling is surrounded by a dry crust or dough.

Methods of Applying the Polyol Polyesters

A coating of polyol polyesters can be applied to the surface of the present food products by any method known to the art. Examples of suitable methods include immersing or dipping, spraying or blowing, pouring, pan coating (e.g. in a revolving pan), brushing, applying with a roller, rolling around in a container of coating, using falling film methods, enrobing and curtain coating. Combinations of these methods can also be used. A thin continuous, uniform coating is most preferred.

A preferred coating method is immersion, which can be done with or without the application of heat. For example, a snack food such as a cracker can be immersed in a container of liquid or melted polyol polyester, then allowed to drain, leaving a thin, continuous surface coating. Alternatively, a thin coating of polyol polyester can be applied to the surface of a cereal or starch-based snack food by frying the food in a polyol polyester frying medium. Upon removal of the food from the frying medium, a coating or film of sucrose polyester will remain on the surface, thereby acting as a barrier to moisture absorption. Frying is generally done at a temperature between 325° F. (163° C.) and 500° F. (260° C.); therefore, immersing at a temperature below 250° F. (121° C.) does not include frying.

Spraying can be done by atomizing liquid or melted polyol polyesters with a stream of air, with an aerosol, or using hydraulic techniques. Spraying can be in the form of a fine mist or spray or in coarse droplets. Various types of spray devices and spray nozzles (atomizers) are described in Perry & Chilton, *Chemical Engineers' Handbook*, 5th Edition, pp. 18–49 to 18–50 and 18–61 to 18–64, McGraw-Hill, New York (1973). The spray nozzles include hollow core, solid core, oval-orifice fan, deflector jet, impinging jet, by-pass, and poppet. The polyol polyesters can be sprayed on the foods in liquid form, or as a powder and subsequently melted to make a continuous coating. The foods can be tumbled and sprayed simultaneously to ensure uniform coating, for example in a rotating drum.

Spraying can be done before or after other food processing as appropriate, as long as a polyol polyester coating is left on the foods after processing is done. As an example, polyol polyester can be applied to most snack foods by directly spraying onto the surface after frying or baking the product.

In falling film methods, the food passes through and is enrobed by a falling film of liquid or melted polyol polyester. In a similar method, curtain coating, polyol polyester is extruded in the form of a molten sheet which is caused to envelop the food product to be coated, usually with the aid of suction.

Following application by spraying, enrobing, immersing or other method, excess polyol polyester can be removed from the surface of the foods, if necessary, by draining, air drying with hot or cool air, infrared drying, or using another drying method known to the art.

Various methods for applying edible coatings to foods are discussed in Daniels, *Edible Coatings and Soluble Packaging*, Noyes Data Corp., Park Ridge, N.J. (1973).

Analytical Methods

I. Viscosity Measurement of the Polyol Fatty Acid Polyesters

A. Sample Preparation

The polyester sample is melted in a hot water bath at greater than 190° F. (87.8° C.). The melted polyester is thoroughly mixed and ten grams of the melted sample is weighed into a vial. The vial is covered and then heated in a hot water bath to greater than 190° F. (87.8° C.). The sample is then allowed to recrystallize at 100° F.±5° F. (37.8° C.±3° C.) for 24 hours in a constant temperature room. After the 24 hour time period has elapsed, the sample is taken to the viscometer and the viscosity is measured.

B. Ferranti-Shirley Viscometer Operation Procedure

A Ferranti-Shirley viscometer (Ferranti Electric, Inc., 87 Modular Ave., Commack, N.Y. 11725) equipped with a 600 g torque spring is used for the viscosity measurement. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds. The test is started by selecting the rpm for 10 seconds-1 shear rate and recording on the strip chart recorder. The shear stress is recorded at 10 minutes after the point at which the shear stress reaches the maximum value. Viscosity (poise) = shear stress (dynes/cm$^2$) divided by shear rate (seconds$^{-1}$).

II. Liquid/Solid Stability Measurement of the Polyol Fatty Acid Polyesters

The polyester sample is heated in a hot water bath at greater than 190° F. (87.8° C.) until it completely melts and is then thoroughly mixed. The sample is then poured into centrifuge tubes to capacity at 100° F. (37.8° C.). The samples then are allowed to recrystallize for 24 hours at 100° F. (37.8° C.) in a constant temperature room. The samples are then centrifuged at 60,000 rpm in a Beckman Model L8 70M centrifuge having a Beckman Model SW60 head (Beckman Instruments, Palo Alto, Calif.) for one hour at 100° F. (37.8° C.). The maximum force on the samples is 485,000 g's (i.e., the force at the bottom of the centrifuge tubes). The percent liquid separated is then measured by comparing the relative heights of the liquid and solid phases. Liquid/solid stability (%) = 100 × (total volume of sample −− volume of liquid that separated)/total volume of sample.

III. Solid Fat Content Measurement

Before determining SFC values, the polyol fatty acid polyester sample is heated to a temperature of 158° F. (70° C.) or higher for at least 0.5 hours or until the sample is completely melted. The melted sample is then tempered at a temperature of 40° F. (4.4° C.) for at least 72 hours. After tempering, the SFC value of the sample at a temperature of 100° F. (37.8° C.) is determined by pulsed magnetic resonance. The method for determining SFC values by pulsed magnetic resonance is described in Madison and Hill, *J. Amer. Oil Chem.Soc.*, vol. 55 (1978), pp. 328–31 (herein incorporated by reference). Measurement of SFC by pulsed magnetic resonance is also described in A.O.C.S. Official Method Cd. 16–81, *Official Methods and Recommended Practices of The American Oil Chemists Society*, 3rd Ed., 1987 (herein incorporated by reference).

IV. Fatty Acid Composition of Polyol Polyesters

Fatty acid composition (FAC) of the polyester is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American Oil Chemists Society*, 3rd Ed., 1984, Procedure Ce 1-62.

V. Ester Distribution of Sucrose Polyesters

The relative distribution of the individual octa-, hepta-, hexa- and penta- esters, as well as collectively the tetra- through mono- esters, of the polyester can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e., an evaporative light scattering detector). The detector response is measured and then normalized to 100%. The individual ester groups are expressed as a relative percentage.

The following examples are intended only to further illustrate the invention and are not intended to limit the scope of the invention which is defined by the claims.

EXAMPLE 1

Crackers are surface coated with a thin, uniform layer of sucrose fatty acid polyester. Sucrose polyester held in a container is thoroughly melted by raising the temperature to about 150° F. (66° C.). The crackers are then immersed into the molten sucrose polyester and after several seconds of residence time they are removed. The excess sucrose polyester is allowed to drain from the crackers in a warm air environment, after which the crackers are allowed to cool to room temperature. The sucrose polyester which remains on the crackers forms a thin, continuous surface coating which is highly resistant to passage of moisture.

The sucrose fatty acid polyester used is made by esterifying sucrose with a blend of partially hydrogenated (I.V. 107) and nearly completely hydrogenated (I.V. 8) soybean oil methyl esters, in a 45:55 ratio. The polyester has the following composition and physical properties:

| % Octaester | | 88.1 |
|---|---|---|
| % Heptaester | | 11.9 |
| % Hexaester | | <0.1 |
| % Pentaester | | <0.1 |
| % Lower esters | | <0.1 |
| GC FAC | C16 | 10.1 |
| | C18 | 51.7 |
| | C18:1 | 20.4 |
| | C18:2 | 15.4 |
| | C18:3 | 1.1 |
| | Others | 1.3 |
| Iodine Value | | 47.2 |
| Viscosity | | 44 Poise |
| Liquid/Solid Stability | | 94% |
| SFC Profile | 50° F. (10° C.) | 60.8 |
| | 70° F. (21° C.) | 47.7 |
| | 80° F. (27° C.) | 35.5 |
| | 92° F. (33° C.) | 19.6 |
| | 105° F. (41° C.) | 3.0 |

EXAMPLE 2

Two water vapor transmission studies are conducted. The first study compares the rate of water vapor transmission through sucrose polyester oils versus through triglyceride oils. The second study compares water vapor transmission through different chain length sucrose polyesters.

Water vapor transmission rate (WVTR). A model system is used to measure WVTR through sucrose polyester and triglyceride oils at 140° F. (60° C.) and 180° F. (82° C.) via a gravimetric procedure. Pyrex glass beakers (100 ml) are treated with dichlorooctamethyltetra siloxane (Surfasil, Pierce Chemical Company) to convert the polar glass surface to a hydrophobic surface. Fifty ml of distilled water is added to each beaker, after which 10 ml of sucrose polyester or triglyceride sample is carefully layered over the water surface. The beakers are weighed and then placed in a desiccator maintained at 0% relative humidity with $CaSO_4$ (Drierite). Thus, a constant water vapor pressure driving force is maintained across the quiescent oil layer. Desiccators are stored at the appropriate temperature and several times over a 48 hour period the beakers are removed and reweighed. Weight loss per unit surface area of the oil layer (due to evaporation) is plotted against time and the slope (WVTR) determined via linear regression. WVTR is the amount of moisture transferred per unit surface area and time under steady-state conditions (mg $H_2O/cm^2$ hr). All sucrose polyester and triglyceride samples are run in duplicate.

Water vapor transmission through sucrose polyester oils versus through triglyceride oils. The following sucrose polyester (SPE) and triglyceride (TG) oils are used in the first water vapor transmission study:

I107 SPE: Liquid sucrose polyester esterified with soybean oil fatty acids. Fatty acid composition: 10.4% $C_{16:0}$, 8.3% $C_{18:0}$, 45.8% $C_{18:1}$, 32.8% $C_{18:2}$, 2.1% $C_{18:3}$ and 0.6% others. Iodine value of 101.6. 90.5% octaester, 7.7% heptaester.

Canola 90 SPE: Liquid sucrose polyester esterified with canola oil fatty acids. Fatty acid composition: 3.7% $C_{16:0}$, 6.1% $C_{18:0}$, 70.2% $C_{18:1}$, 14.4% $C_{18:2}$, 0.6% $C_{18:3}$ and 5.0% others. Iodine value of 89.2. 97.0% octaester, 3.0% heptaester.

IMF SPE: Intermediate melting, semisolid sucrose polyester esterified with soybean oil fatty acids. Fatty acid composition: 9.6% $C_{16:0}$, 51.3% $C_{18:0}$, 21.3% $C_{18:1}$, 15.2% $C_{18:2}$, 1.0% $C_{18:3}$ and 1.6% others. Iodine value of 47.5. 92.0% octaester, 8.0% heptaester. Viscosity: 25.9 poise after 10 minutes of steady shear at a shear rate of 10 seconds$^{-1}$. Liquid/solid stability: 92.5%.

I107 TG: Liquid soybean oil. Fatty acid composition: 11.0% $C_{16:0}$, 4.5% $C_{18:0}$, 45.4% $C_{18:1}$, 34.7% $C_{18:2}$, 4.1% $C_{18:3}$, and 0.3% others. Iodine value: 107.

Canola 90 TG: Liquid canola oil. Fatty acid composition: 4.3% $C_{16:0}$, 2.5% $C_{18:0}$, 76.2% $C_{18:1}$, 12.2% $C_{18:2}$, 2.0% $C_{18:3}$, and 2.8% others. Iodine Value: 90.

Table 1 below shows the water vapor transmission rates through the different sucrose polyester and triglyceride samples, measured at 140° F. (60° C.).

TABLE 1

| WVTR Through SPE and TG Oils | |
|---|---|
| Oil | WVTR (mg. $H_2O/cm^2$ hr) |
| I107 SPE | 0.11 |
| Canola 90 SPE | 0.11 |
| IMF SPE | 0.09 |
| I107 TG | 0.25 |
| Canola 90 TG | 0.26 |

Substantial differences in rate of moisture transfer through triglyceride and sucrose polyester oils are observed. The WVTR through triglyceride at 140° F. (60° C.) is approximately 2.3-fold greater than the value through the corresponding sucrose polyester.

The IMF SPE and I107 TG are blended in varying ratios, and the water vapor transmission rates of the blends are measured at 140° F. (60° C.) and 180° F. (82° C.). Table 2 below shows the results.

TABLE 2

| WVTR Through SPE/TG Blends | | |
|---|---|---|
| Blend | Temperature | WVTR (mg. $H_2O/cm^2$ hr) |
| 100% SPE | 140° F. (60° C.) | 0.12 |
| 67% SPE/33% TG | 140° F. (60° C.) | 0.15 |
| 33% SPE/67% TG | 140° F. (60° C.) | 0.20 |
| 100% TG | 140° F. (60° C.) | 0.27 |
| 100% SPE | 180° F. (82° C.) | 0.33 |
| 67% SPE/33% TG | 180° F. (82° C.) | 0.53 |
| 33% SPE/67% TG | 180° F. (82° C.) | 0.74 |
| 100% TG | 180° F. (82° C.) | 0.87 |

The results demonstrate that WVTR at 140° F. (60° C.) and 180° F. (82° C.) decreases steadily as percent sucrose polyester in the blend is increased. The reduction in rate of moisture transfer is most significant at the higher temperature, decreasing 3-fold as the level of sucrose polyester is elevated from 0% to 100%.

Water vapor transmission through different chain length sucrose polyesters. The second water vapor transmission study compares the WVTR's of different chain length sucrose polyesters. The I107 SPE, Canola 90 SPE and IMF SPE described hereinabove are used in the study. An "S35" SPE is also used, having the following properties: Fatty acid composition: 10.0% $C_{16:0}$, 5.1% $C_{18:0}$, 74.8% $C_{18:1}$, 8.6% $C_{18:2}$, 0.2% $C_{18:3}$ and 1.3% others. Iodine value of 79.1. Mostly liquid sucrose polyester esterified with soybean oil fatty acids.

69.0% octaester, 30.0% heptaester. Additionally, samples of sucrose octamyristate, sucrose octalaurate, and sucrose octacaprylate are used in the study.

The following Table 3 shows the water vapor transmission rates through the different sucrose polyester samples, measured at 140° F. (60° C.).

TABLE 3

WVTR Through SPE Versus Fatty Acid Chain Length

| SPE | Fatty Acid Chain Length | WVTR (mg. $H_2O/cm^2$ hr) |
|---|---|---|
| I107 | C18 | 0.12 |
| Canola 90 | C18 | 0.12 |
| IMF | C18 | 0.12 |
| S35 | C18 | 0.12 |
| Sucrose octamyristate | C14 | 0.15 |
| Sucrose octalaurate | C12 | 0.18 |
| Sucrose octacaprylate | C8 | 0.44 |

The chain length of fatty acid moieties in S35, IMF, I107 and Canola 90 SPE's is predominantly $C_{18}$. The WVTR through these four sucrose polyester materials is almost identical. The WVTR through the sucrose octamyristate ($8C_{14}$), sucrose octalaurate ($8C_{12}$) and sucrose octacaprylate ($8C_8$) increases exponentially as fatty acid chain length is reduced.

While not intending to be limited by theory, it is believed that as the chain length of the sucrose polyester fatty acids is reduced, the water solubility or partitioning coefficient is increased. An increased water solubility, in turn, leads to an increase in WVTR through the oil layer. WVTR is markedly increased by reducing chain length of the fatty acid moieties on the sucrose backbone. However, the rate of water vapor transport through sucrose polyester is maintained significantly lower than that of triglycerides as long as the hydrocarbon chain length of the fatty acids on the sucrose backbone is $C_{12}$ or longer.

What is claimed is:

1. A method for reducing the rate or moisture transmission into and out of foods comprising enveloping the foods with a thin continuous coating comprising an effective amount of polyol fatty acid esters, wherein the polyol fatty acid esters have at least 4 fatty acid ester groups, wherein at least about 90% of the fatty acids contain not less than 16 carbon atoms, wherein the polyol polyester has a solid fat content between about 3% and about 10% at 100° F., wherein the coating is done by a process selected from the group consisting of spraying, pouring, pan coating, brushing, applying with a roller, rolling in a container, using a falling film method, enrobing, curtain coating, immersing at a temperature below 250° F., and combinations thereof, and wherein the food is selected from the group consisting of breakfast cereals, bakery products, dehydrated foods, fruits, vegetables, meats, frozen foods, filled pastries, pies, confectioneries, and mixtures thereof.

2. A method according to claim 1 wherein the coating comprises at least about 25% polyol fatty acid esters.

3. A method according to claim 1 wherein the polyol polyester additionally comprises sufficient anti-anal leakage agent to prevent leakage of the polyol polyester.

4. A method according to claim 1 wherein the polyol polyester has a liquid/solid stability of at least about 30% at 100° F.

5. A method according to claim 1 wherein the polyol polyester has a viscosity at 100° F. (37.8° C.) of at least about 0.5 poise after 10 minutes of steady shear at a shear rate of 10 seconds$^{-1}$.

6. A method according to claim 1 wherein the polyol fatty acid esters are sucrose fatty acid esters.

7. A method according to claim 6 wherein at least about 85% of the sucrose fatty acid esters are selected from the group consisting of octaesters, heptaesters, hexaesters, and mixtures thereof.

8. A method according to claim 7 wherein at least about 70% of the esters are octaesters.

9. A method according to claim 7 wherein the content of the pentaesters and lower esters is not more than about 3%.

10. A food enveloped with a thin continuous coating comprising an effective amount of polyol fatty acid esters, wherein the polyol fatty acid esters have at least four fatty acid ester groups, wherein at least about 90% of the fatty acids contain not less than 16 carbon atoms, wherein the polyol polyester has a solid fat content between about 3% and about 10% at 100° F. and wherein the food is selected from the group consisting of breakfast cereals, bakery products, dehydrated foods, fruits, vegetables, meats, frozen foods, filled pastries, pies, confectioneries, and mixtures thereof.

11. A food according to claim 10 wherein the polyol is sucrose.

12. A food according to claim 10 wherein the food is a breakfast cereal.

13. A food according to claim 10 wherein the food is a multicomponent food selected from the group consisting of filled pies and filled pastries.

14. A food according to claim 10 wherein the coating comprises at least about 25% polyol fatty acid esters.

15. A food selected from the group consisting of cereal-based snack foods and starch-based snack foods, and mixtures thereof, wherein the food is coated according to the method of claim 1.

* * * * *